UNITED STATES PATENT OFFICE.

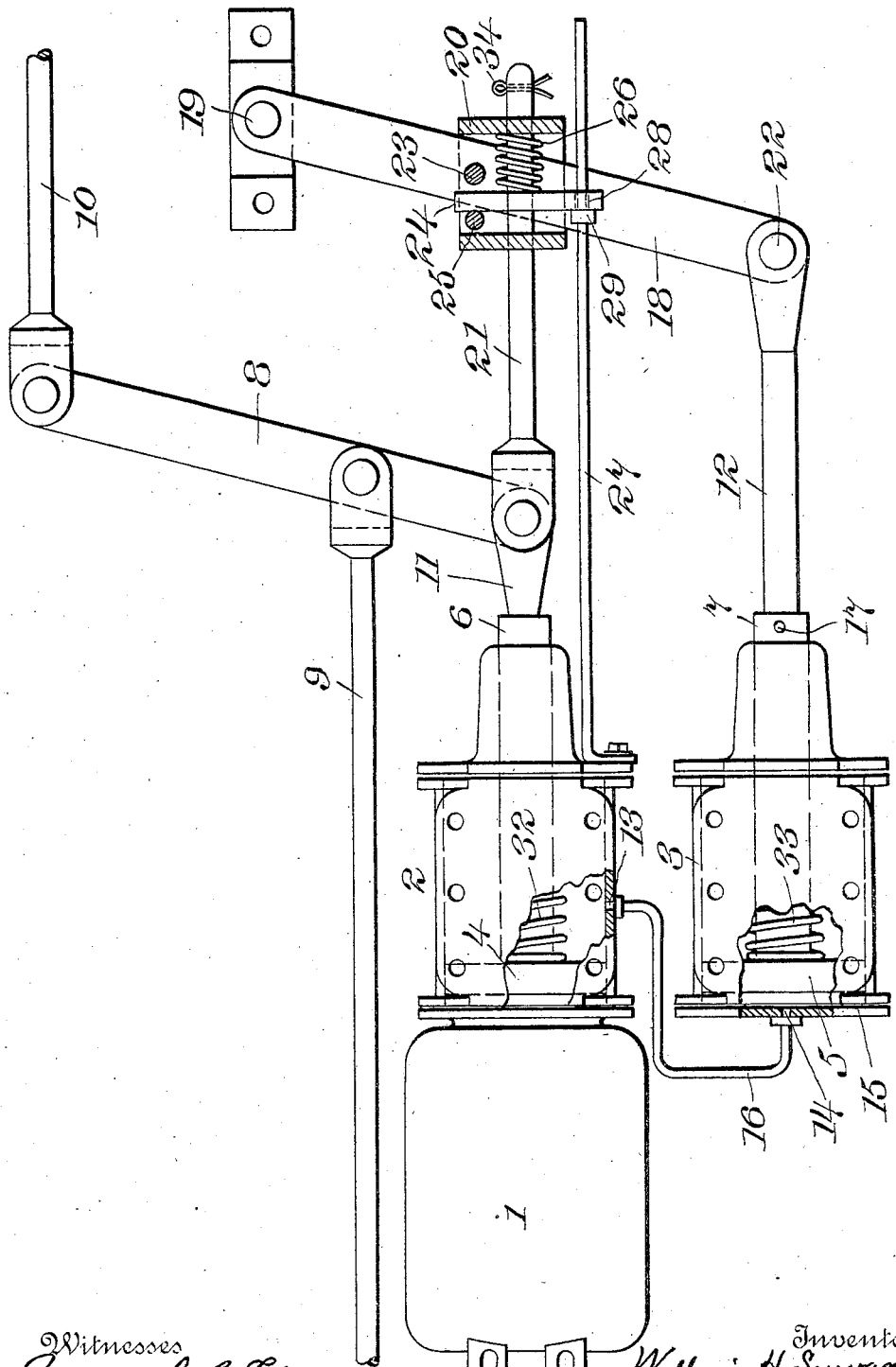

WILLIAM H. SAUVAGE, OF NEW YORK, N. Y., ASSIGNOR TO SAUVAGE SAFETY BRAKE COMPANY, A CORPORATION OF NEW JERSEY.

FLUID-PRESSURE BRAKE.

No. 852,525.

Specification of Letters Patent.

Patented May 7, 1907.

Application filed November 21, 1906. Serial No. 344,437.

*To all whom it may concern:*

Be it known that I, WILLIAM H. SAUVAGE, a citizen of the United States of America, and a resident of the borough of Manhattan, city, county, and State of New York, have invented certain new and useful Improvements in Fluid-Pressure Brakes, of which the following is a specification.

The invention disclosed comprises certain improvements on that shown in my reissued Letters Patent No. 12,229 dated June 7th, 1904.

The best form of apparatus embodying my invention at present known to me is illustrated in the accompanying drawing which shows a plan view of a portion of the usual freight car brake apparatus with my invention applied thereto, parts being broken away and the brakes shown in release position.

Throughout the drawing, like reference figures indicate like parts.

1 is the auxiliary reservoir, 2 the usual cylinder having piston 4, hollow piston rod 6, push rod 11 and spring 32. One brake lever 8 is shown with a portion of tie rod 9 and of one top rod 10.

3 is a second or auxiliary cylinder having piston 5, hollow piston rod 7, spring 33 and push rod 12.

13 is a port in the side wall of cylinder 2 and so located as to be uncovered by piston 4 when it has traveled about 5—½ inches.

14 is a port in the pressure head 15 of cylinder 3, connected to port 13 by pipe 16.

17 is a pin connecting hollow piston rod 7 of the second cylinder 3 with its push rod 12.

18 is a lever pivoted to a fixed fulcrum 19 on the car body at one end and at the other end to the push rod 12 by pin 22. A friction clutch composed of the rectangular frame 20 perforated at the ends for the passage of the rod 21 and having the perforated clutch dog 24, is pivoted to lever 18 by pin 23. The dog 24 is fulcrumed on the pin 25, and held in engagement by spiral spring 26 mounted on rod 21 and compressed between the dog and one end of the clutch frame. This forms a gripping device connecting the second piston to the brake rigging.

27 is a trip rod fastened at one end to the first cylinder 2 or other fixed point of support and passing through a perforation 28 in the end of the dog 24. It has a stop 29 engaging the dog when the second piston is at its inmost position. A stop 34 may be placed on rod 21 to prevent excessive travel of piston 5 in case the clutch dog 24 should slip.

In operation the first cylinder and brake rigging operate in the usual manner. The rod 21 moves freely through the clutch on the out stroke of the first piston 4. When piston 4 passes port 13, air passes through pipe 16 to cylinder 3 and forces piston 5 out. This piston being connected to the brake rigging through push rod 12, lever 18, the clutch and rod 21, as soon as the clutch dog 24 is moved away from stop 29, adds its force with double effect to the tension of the brake rigging. When the air is exhausted from the cylinders piston 5 first comes home, causing the clutch dog to again strike stop 29 and trip the clutch so that rod 21 is released and piston 4 may continue on its return stroke releasing the brakes without any delay except such as results from forcing a portion of the air through pipe 16. I find this slightly delayed final release an advantage on long trains as it tends to permit the cars to adjust themselves relative to one another before the brakes are completely released and so avoid breaking the train in two when releasing long trains at slow speeds.

The apparatus disclosed is particularly advantageous in its action in applying brakes in that the first cylinder applies the brakes quickly but without great force as the air is bled off into the second cylinder. The latter puts on the maximum brake pressure after a delay of a fraction of a second, thus avoiding the heavy blow of the ordinary single cylinder application. Also in case of much slack existing in the brake rigging as through wear of the brake shoes, the first piston goes nearly to the limit of its travel before sufficient air gets into the second cylinder to start the second piston into action. The result is that the travel of the second piston rarely exceeds 3—½ inches even though the first piston goes the whole length of its cylinder which gives it a travel of 12 inches.

Of course other forms of gripping devices or clutches could be used and other arrangements of levers, and the tripping connection for the clutch might be differently constructed.

Having therefore described my invention, I claim:—

1. In a fluid pressure brake apparatus the combination with the usual cylinder, piston and brake rigging, of a second cylinder and piston, a pipe extending from a port in the side wall of the first cylinder to a port in the pressure head of the second cylinder, a gripping device connecting the second piston with the brake rigging when the said piston is forced outward and means for releasing the gripping device when the second piston completes its return stroke.

2. In a fluid pressure brake apparatus the combination with the usual cylinder, piston and brake rigging, of a second cylinder and piston, a pipe extending from a port in the side wall of the first cylinder to a port in the pressure head of the second cylinder, a gripping device connecting the second piston with the brake rigging when the said piston is forced outward and means for releasing the gripping device when the second piston completes its return stroke, said gripping device comprising a friction clutch, a lever carrying said clutch pivoted at one end to a fixed fulcrum and at the other end to the second piston, and a rod connected to the brake rigging and grasped by said clutch.

3. In a fluid pressure brake apparatus the combination with the usual cylinder, piston and brake rigging, of a second cylinder and piston, a pipe extending from a port in the side wall of the first cylinder to a port in the pressure head of the second cylinder, a gripping device connecting the second piston with the brake rigging when the said piston is forced outward and means for releasing the gripping device when the second piston completes its return travel, said releasing means comprising a fixed stop adapted to be struck by a movable member of the gripping device.

4. In a fluid pressure brake apparatus the combination with the usual cylinder, piston and brake rigging, of a second cylinder and piston, a pipe extending from a port in the side wall of the first cylinder to a port in the pressure head of the second cylinder, a gripping device connecting the second piston with the brake rigging when the said piston is forced outward and means for releasing the gripping device when the second piston completes its return stroke, said gripping device comprising a friction clutch, a lever carrying said clutch pivoted at one end to a fixed fulcrum and at the other end to the second piston, and a rod connected to the brake rigging and grasped by said clutch, said releasing means comprising a fixed stop adapted to be struck by a movable member of the gripping device.

5. In a fluid pressure brake apparatus the combination with the usual cylinder, piston and brake rigging of a second cylinder and piston, means actuated by the movement of the first piston admitting fluid under pressure to the second cylinder, and a friction clutch connecting the second piston with the brake rigging whenever said piston is advanced from its inmost position.

6. In a fluid pressure brake apparatus the combination with the usual cylinder, piston and brake rigging of a second cylinder and piston, means actuated by the movement of the first piston admitting fluid under pressure to the second cylinder, and a friction clutch connecting the second piston with the brake rigging whenever said piston is advanced from its inmost position, together with means for tripping said clutch when the second piston reaches the end of its return stroke.

7. In a fluid pressure brake apparatus the combination with the usual cylinder, piston and brake rigging, of a second cylinder and piston, means controlled by the movement of the first piston admitting fluid under pressure to the second cylinder, a lever pivoted at one end to a fixed fulcrum and at the other end to the second piston, a friction clutch carried by said lever, a rod connected to the brake rigging and engaged by said clutch, and means for tripping said clutch when the second piston is at the end of its in stroke.

8. In a fluid pressure brake apparatus the combination with the usual cylinder, piston and brake rigging, of a second cylinder and piston, means controlled by the movement of the first piston admitting fluid under pressure to the second cylinder, a lever pivoted at one end to a fixed fulcrum and at the other end to the second piston, a friction clutch carried by said lever, a rod connected to the brake rigging and engaged by said clutch, and means for tripping said clutch when the second piston is at the end of its in stroke, said means comprising a fixed stop engaging the clutch dog.

9. In a fluid pressure brake apparatus the combination with the usual cylinder, piston and brake rigging, of a second cylinder and piston, means controlled by the movement of the first piston admitting fluid under pressure to the second cylinder, a lever pivoted at one end to a fixed fulcrum and at the other end to the second piston, a friction clutch carried by said lever, a rod connected to the brake rigging and engaged by said clutch and means for tripping said clutch when the second piston is at the end of its in stroke, said means comprising a rod fastened on the main cylinder passing through a hole in the clutch dog and provided with a stop for said dog.

Signed at New York, N. Y. this 19th day of November, 1906.

WILLIAM H. SAUVAGE.

Witnesses:
A. PARKER-SMITH,
M. G. CRAWFORD.